United States Patent

[11] 3,558,919

[72] Inventor Lamar B. Olk
Livermore, Calif.
[21] Appl. No. 741,762
[22] Filed July 1, 1968
[45] Patented Jan. 26, 1971
[73] Assignee the United States of America as represented by the United States Atomic Energy Commission

[54] AVALANCHE TRANSISTOR PULSE TRAIN GENERATOR
5 Claims, 1 Drawing Fig.

[52] U.S. Cl. .................... 307/243,
307/252, 307/203, 307/302; 328/67
[51] Int. Cl. .................... H03k 17/00
[50] Field of Search .................... 307/260,
252, 284, 305, 302, 283, 243; 328/67; 315/166;

[56] References Cited

UNITED STATES PATENTS

| | | | |
|---|---|---|---|
| 2,655,595 | 10/1953 | Chambers | 328/67 |
| 3,297,885 | 1/1967 | Frye | 307/283 |
| 3,355,626 | 11/1967 | Schmidt | 328/67 |

*Primary Examiner*—Donald D. Forrer
*Assistant Examiner*—David M. Carter
*Attorney*—Roland A. Anderson

ABSTRACT: A circuit for generating a train of high repetition rate, fast rise time pulses with extremely accurate time separation, useful in numerous applications, such as calibration of time interval measurements. The circuit is so arranged that the desirable abrupt breakdown characteristic of an avalanche transistor is employed to derive fast rise time pulses while precise control is maintained over the times at which breakdowns are effected to insure accuracy in the interval between pulses. The circuit is capable of generating 100 volt, 1 nanosecond rise time pulses at a rate of one pulse every 75 nanoseconds with less than 100 picosecond deviation in pulse separation.

PATENTED JAN 26 1971 3,558,919
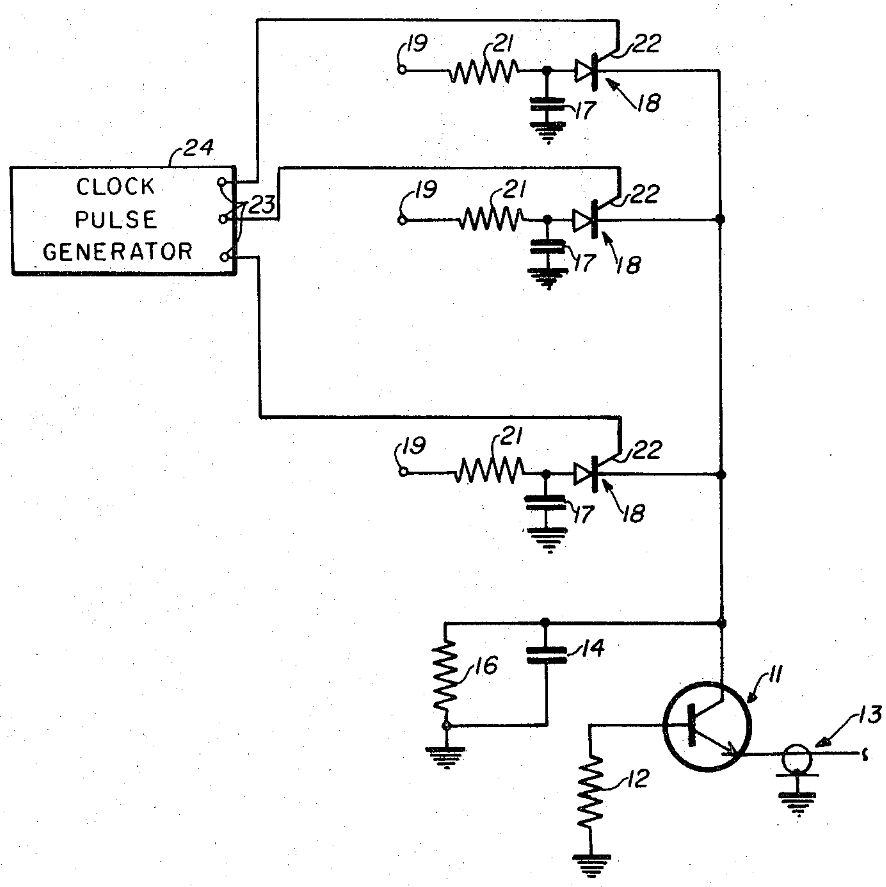
INVENTOR.
LAMAR B. OLK
BY
[signature]
ATTORNEY

AVALANCHE TRANSISTOR PULSE TRAIN GENERATOR

BACKGROUND OF THE INVENTION

This invention was evolved in the course of, or under, Contract W–7405–ENG–48 with the United States Atomic Energy Commission.

Various pulse train generating circuits have been However, the pulses generated by conventional avalanche transistor pulse train generators are generally not separated in time with extreme precision or accuracy for one reason or another. More particularly, in one type of circuit, a charged capacitor is directly connected to the collector of an avalanche transistor and discharged through a load in response to a trigger pulse initiating avalanche breakdown. Fast rise time pulses are thus generated across the load by virtue of the abrupt breakdown characteristic of the transistor. However, the voltage standing on the collector, due to the directly connected charged capacitor, effects the generation of spurious noise in the transistor. The noise may couple with the relatively slow rise time trigger pulses to cause substantial variation in the time intervals between successive output pulses delivered to the load, even though the trigger pulses are accurately constantly spaced in time. Consequently, although fast rise time pulses are produced, they are not separated in time with extreme precision. As another disadvantage of the foregoing type of conventional circuit, the pulse repetition rate is limited by the time required to recharge the capacitor preparatory to the generation of each successive pulse.

Another conventional circuit arrangement for generating a train of fast rise time pulses includes a series of sequentially triggered avalanche transistor pulse circuits coupled by diodes to a common load. Although pulse repetition rate is not limited by capacitor recharge time in this type of circuit, precise and accurate control of pulse separation is not obtained. In this regard, avalanche transistors have extremely sensitive trigger characteristics. The series of transistors are consequently highly susceptible to false triggering by cross modulation and feedback noise such that output pulses may be erroneously produced at other than the desired accurate time intervals.

SUMMARY OF THE INVENTION

The general object of the present invention is to provide an avalanche transistor pulse circuit capable of generating a train of fast rise time pulses at a high repetition rate and with extreme accuracy of separation between pulses.

In the accomplishment of the foregoing, the pulse train generator of the present invention generally comprises an unbiased avalanche transistor, a plurality of charged capacitors or equivalent energy storage means, and means sequentially switching or gating the capacitors in back biasing relation to the transistor to sequentially effect avalanche breakdown thereof. As a result, a corresponding train of fast rise time pulses are delivered to a load coupled to the emitter of the transistor. It is particularly important to note that since no voltage is held on the collector of the transistor until the charge on a capacitor is switched to trigger breakdown, the corresponding output pulse is not affected by collector noise and there is no possibility of premature false triggering of the transistor to erroneously produce an output pulse. The train of pulses are consequently accurately spaced in time substantially precisely in accordance with the time intervals between switchings of the charged capacitors. In addition, since a series of sequentially switched charged capacitors are employed the pulse repetition rate is not limited by the recharging time of a single capacitor and may be made very high.

BRIEF DESCRIPTION OF THE DRAWING

The single FIG. is a schematic circuit diagram of a preferred embodiment of pulse train generator in accordance with the present invention.

DESCRIPTION OF THE PREFERRED EMBODIMENT

Referring now to the drawing in detail, a pulse train generator in accordance with the present invention will be seen to include an avalanche transistor 11 having its base coupled to ground by means of a resistor 12, its emitter connected to a load 13, in the present case a coaxial cable having its outer sheath connected to ground, and its collector connected to the parallel combination of a storage capacitor 14 and resistor 16, in turn connected to ground. With the transistor thus connected, it will be appreciated that in response to the establishment of a back bias on the collector in excess of the avalanche breakdown potential of the transistor, a relatively heavy avalanche current is abruptly delivered through the collector-emitter path to the load, thereby producing a fast rise time pulse of high amplitude. In the illustrated case transistor 11 is of type NPN such that the development of a positive potential across capacitor 14 is required to provide the back bias on the collector for triggering breakdown. A type PNP transistor may, of course, be alternatively employed, in which case a negative potential is required to trigger breakdown.

In order to develop potentials on the capacitor 14 for sequentially triggering the transistor 11 to produce a train of pulses at the load 13, there are provided a plurality of capacitors 17 correspondingly coupled by a plurality of silicon controlled rectifiers 18, or equivalent gate means, to the collector of the transistor. More particularly, a plurality of terminals 19 adapted for connection to a high voltage power supply are respectively coupled to the capacitors 17 by a corresponding plurality of current limiting resistors 21, and the capacitors are in turn connected to ground. The junctions between the capacitors and resistors are, in the present case, respectively connected to the anodes of the plurality of rectifiers, while the cathodes thereof are commonly connected to the collector of the transistor. Gate leads 22 of the rectifiers are respectively connected to a plurality of time interval separated pulsing terminals 23 of a clock pulse generator 24. The clock pulse generator produces a sequence of clock pulses at the respective pulsing terminals to thereby gate the rectifiers in succession. The clock pulse generator may, for example, comprise a delay line having taps at desired intervals to define the pulsing terminals, whereby a pulse propagating down the line provides the clock pulses sequentially at the respective terminals.

In the overall operation of the pulse train generator physically described hereinbefore, the capacitors 17 are first charged to substantially the potential of a high voltage supply connected to the terminals 19. The charged capacitors are isolated from the collector of transistor 11 by the normally nonconducting silicon controlled rectifiers 18 until such time as one thereof is gated into conduction by a clock pulse at the corresponding one of the terminals 23 of clock pulse generator 24. Responsive to the first clock pulse at the uppermost terminal 23, as viewed in the drawing, the corresponding rectifier is gated to thereby deliver the charge of the associated capacitor 17 to the capacitor 14. The time constant of capacitor 14 and resistor 16 is selected to be relatively small such that capacitor 14 charges rapidly and develops a fast rising potential at the collector of transistor 11. As the potential exceeds the breakdown voltage of the transistor, avalanche breakdown is abruptly initiated and an extremely low resistance current path is establish through the transistor to the load 13. A very heavy current flow to the load thus occurs as the capacitor 14, and capacitor 17 delivering charge thereto, are discharged through the transistor. The resulting high pulse delivered to the load has an extremely fast rise time equal to the time required for breakdown of the transistor to occur responsive to the triggering of breakdown by the collector potential exceeding the breakdown voltage. Typically, the breakdown time, and hence the pulse rise time, is of the order of a nanosecond.

As the capacitors discharge, the potential on the collector of the transistor correspondingly decreases to a level below the breakdown voltage, whereupon the transistor is rendered nonconducting and the pulse delivered to the load is terminated. At substantially the same time the capacitor 17 has discharged to the extent that current flow therefrom is less than the holding current level of the associated silicon controlled rectifier 18. The rectifier is consequently rendered nonconducting and its gate regions control.

The foregoing cycle of operation is sequentially repeated for the successive charged capacitor and silicon controlled rectifier networks in response to the appearance of the time separated clock pulses at the successive terminals 23 of clock pulse generator 24. The charged capacitors 17 are thus successively discharged through the transistor to the load to produce a train of time separated, high amplitude, fast rise time pulses in the manner previously described relative to the first pulse. The clocking time interval is, of course, selected to be sufficient to permit a preceeding capacitor 17 to discharge below the holding level of its associated silicon controlled rectifier, prior to gating of the next successive charged capacitor 17. However, such interval may be made extremely short since discharge through the transistor takes place very rapidly. Consequently, the pulse repetition rate of the output pulse train delivered to the load 13 may be made relatively high. It will be appreciated that in the event a continuous train of pulses is to be generated, the number of capacitors 17 and charging time thereof are appropriately selected to enable the first capacitor to be recharged prior to the time a clock pulse is next provided at the first one of clock pulse generator terminals 23.

It is particularly important to note that no bias is applied to the collector of transistor 11 except at the times the charged capacitors 17 are gated thereto by the associated silicon controlled rectifiers 18 to trigger avalanche breakdown. Inconsistency in the breakdown voltage due to noise, and the like, and false triggering of the transistor are thereby prevented. Although the silicon controlled rectifiers 18 typically have a slow rise time response, their trigger delay and rise time are highly duplicatable whereby the delay time between triggering of each rectifier and breakdown of the transistor is very nearly constant. As a result, the fast rise time pulses delivered to the load are extremely accurately and precisely related to the pulses from clock pulse generator 24 and are separated in time with substantial constancy.

I claim:

1. A pulse train generator comprising:
   - a normally unbiased avalanche transistor having an emitter, base, and collector, said base coupled to ground;
   - a load coupled to said emitter of said transistor;
   - a plurality of energy storage means for storing a predetermined potential; and
   - means coupling said energy storage means to said collector of said transistor for sequentially gating the stored potentials of said storage means in back biasing relation to said collector to sequentially trigger avalanche breakdown of said transistor and discharging said storage means to said load, said collector of said transistor being thereby isolated from said storage means and unbiased except when said stored potentials are gated thereto to trigger breakdown.

2. A pulse train generator according to claim 1, further defined by:
   - said storage means comprising a plurality of charged capacitors; and
   - said means coupling said energy storage means to said collector including:
     - a plurality of normally nonconducting gating means correspondingly coupling said capacitors to said collector; and
     - clock pulse generator means coupled in controlling relation to said gating means for sequentially rendering same conducting.

3. A pulse train generator according to claim 2, further defined by:
   - said gating means comprising a plurality of silicon-controlled rectifiers correspondingly coupling said capacitors to said collector, each of said rectifiers having a gate lead for rendering the rectifier conducting in response to a pulse applied thereto; and
   - said clock pulse generator means being a clock pulse generator for producing a sequence of clock pulses respectively at a plurality of time interval separated pulsing terminals thereof, said pulsing terminals respectively connected to the gate leads of said silicon controlled rectifiers.

4. A pulse train generator according to claim 2, further defined by said means coupling said energy storage means to said collector further including:
   - a second capacitor coupled between said collector and ground; and
   - a resistor connected in parallel with said second capacitor.

5. A pulse train generator according to claim 4, further defined by:
   - said gating means comprising a plurality of silicon-controlled rectifiers correspondingly coupling said plurality of capacitors to said collector, each of said rectifiers having a gate lead for rendering the rectifier conducting in response to a pulse applied thereto; and
   - said clock pulse generator means being a clock pulse generator for producing a sequence of clock pulses respectively at a plurality of time interval separated pulsing terminals thereof; said pulsing terminals respectively connected to the gate leads of said silicon controlled rectifiers.